May 20, 1930. L. G. PETERS 1,759,590
SKIDLESS TIRE
Filed June 14, 1929

INVENTOR
Louis G. Peters
BY
Zoltan Polachek
ATTORNEY

Patented May 20, 1930

1,759,590

UNITED STATES PATENT OFFICE

LOUIS G. PETERS, OF NEW YORK, N. Y.

SKIDLESS TIRE

Application filed June 14, 1929. Serial No. 370,856.

This invention relates to new and useful improvements in non-skid tires.

The invention has for an object the provision of a device of the class mentioned which is of simple durable construction, dependable in use and efficient in action, and which can be manufactured and sold at a reasonable cost.

The invention proposes the use of a plurality of metal traction members embedded in the shoe of a tire so that the outer faces are flush with the tread, and the traction members to be arranged in groups and securely held against possible flying out while the tire is on a wheel of a vehicle traveling at high speed. Each traction member should have a shank and a head of any design, the shank to be connected with chains constituting the holding means. Further, the traction members may be arranged with adjustable portions for resetting the outer faces flush with the tread after some wear.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Figure 1:
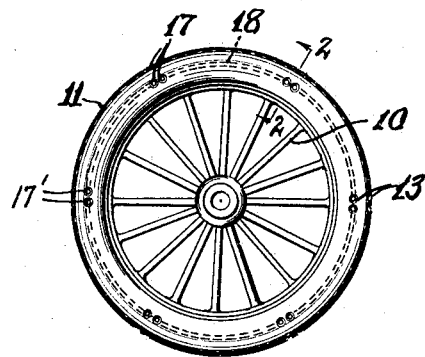
Fig. 1 is a side elevational view of a wheel with a tire constructed according to this invention.
Figure 2:
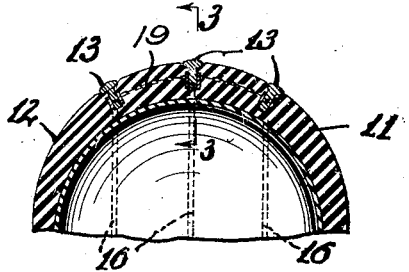
Fig. 2 is an enlarged fragmentary transverse sectional view taken on the line 2—2 of Fig. 1.
Figure 4:
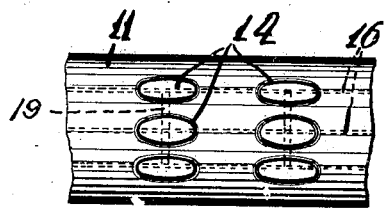
Fig. 4 is a fragmentary plan view of a tire as though looking in the direction of the line 4—4 of Fig. 3.
Figure 3:
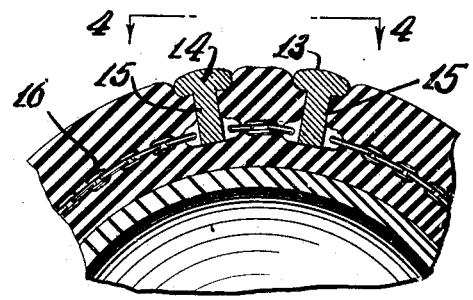
Fig. 3 is a fragmentary longitudinal vertical sectional view taken on the line 3—3 of Fig. 2.

The reference numeral 10 indicates generally a wheel of any design or construction provided with a tire 11 having a shoe 12. A plurality of metal traction members 13 are arranged in the tread of the tire and embedded so that their top faces are flush with the tread. These metal traction members may be of various shapes and designs.

Each of the traction members 13 consists of a head portion 14 and a shank 15. The shanks are connected with circular chains 16. These circular chains, preferably three in number, extend completely around within the tire shoe and are also embedded in the material forming the shoe. In each of the circular chains 16, the metal traction members are arranged in groups of two. This is readily seen in Fig. 1 in which numeral 17 indicates one group of two traction members, numeral 18 a space, and numeral 17' another group of traction members and so on completely around the wheel. The circular chains 16 are connected by transverse chains 19. These chains extend between metal traction members of each of the circular chains.

Figure 6:
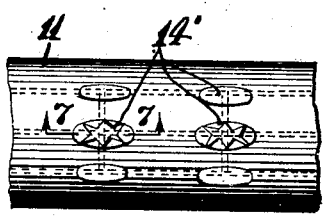
Fig. 6 is a fragmentary plan view of the tire shown in Fig. 5 looking in the direction of the arrows 6—6 of this Fig.
Figure 5:
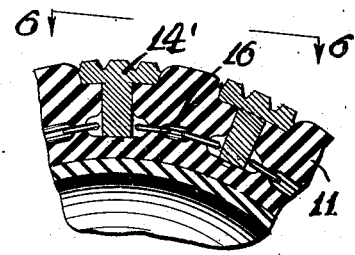
Fig. 5 is a view similar to Fig. 3 but illustrating a modified form.

In Figs. 1 to 4 inclusive, the metal traction members have been shown provided with plain oval shaped heads. In Figs. 5 and 6, the traction members are shown formed with oval shaped heads 14' having teeth. These teeth add to the traction ability of the members. In the event that any of the metal traction members become loose during use of the tire, the chains are depended upon to hold them against flying out due to centrifugal force while a vehicle provided with the tires is in motion.

Figure 7:
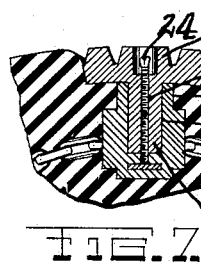
Fig. 7 is a fragmentary sectional view of another modified form seen as though looking in the direction of the arrows 7—7 of Fig. 6.

In use, the metal traction members may wear faster than the adjacent rubber portions of the tire shoe in that the rubber portions have a certain amount of give which tends to reduce wear. For this reason a modified form of traction member is illustrated in Fig. 7 which is provided with an adjustable head capable of being reset so that its outer face is flush with the tread of tire. Each of these traction members consists of a shank casing 20 provided with a central bore 21. The chains 16 and 19 are connected with the casing 20. A stem 22 is slidably mounted in the central bore 21 and is formed at its outer end with the traction head 14'. A screw 23 threadedly engages thru the stem 22 and is rotatively mounted in the shank casing 20. This screw is provided with a head 24 arranged for engagement by a turning tool. Rotation of this screw moves the traction head and stem so that the face may be made flush with the tread.

Figure 8:
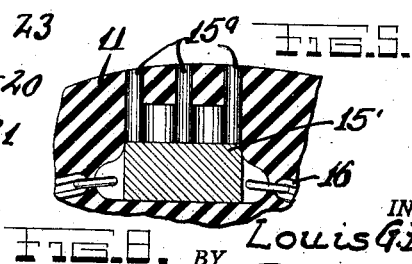
Fig. 8 is a similar view to Fig. 3 but showing another modified form.

In Fig. 8, shank 15' is shown with a plurality of upwardly projecting members $15^a$ embedded in the tire 11 so as to keep the end faces of the upwardly projecting members $15^a$ flush with the outer periphery of the tire.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure my United States Letters Patent is:—

1. A non-skid tire having a plurality of metal traction members embedded therein with their outer faces flush with the tread and each consisting of a shank casing with a central bore, a traction head with a stem slidably engaged in the bore, means for firmly holding the shank casings against displacement, and means for holding the stems at various extended positions from the casings for readjustments of the traction heads upon wear, said last mentioned means comprising a screw rotatively mounted on each shank casing and threadedly engaging each stem and having a head located within a recess in the traction head so as to be accessible from the exterior of the tire.

2. A non-skid tire having a plurality of metal traction members embedded therein with their outer faces flush with the tread, and each consisting of a shank casing with a central bore, a traction head with a stem slidably engaged in the bore, means for firmly holding the shank casings against displacement, and means for holding the stems at various extended positions from the casings for readjustments of the traction heads upon wear, said last mentioned means comprising coacting means between each shank casing and stem for holding these parts in relative positions and including a head located within a recess in the traction head so as to be accessible from the exterior of the tire.

In testimony whereof I have affixed my signature.

LOUIS G. PETERS.